United States Patent [19]

Elmis et al.

[11] Patent Number: 5,798,802
[45] Date of Patent: Aug. 25, 1998

[54] VIDEO SIGNAL CLAMPING CIRCUIT

[75] Inventors: Herbert Elmis, Denzlingen; Heinrich Koehne, Voerstetten; Herbert Alrutz, Freiburg; Hermann Zibold, Kenzingen, all of Germany

[73] Assignee: Deutsche ITT Industries GmbH, Freiburg, Germany

[21] Appl. No.: 791,362

[22] Filed: Jan. 30, 1997

[30] Foreign Application Priority Data

Jan. 31, 1996 [DE] Germany ......................... 196 03 316.0
Oct. 22, 1996 [EP] European Pat. Off. ............. 96116936

[51] Int. Cl.$^6$ .................................................. H04N 5/18
[52] U.S. Cl. ........................ 348/689; 348/691; 348/694
[58] Field of Search ............................ 348/689, 691, 348/694–697, 555, 604, 678; H04N 5/18

[56] References Cited

U.S. PATENT DOCUMENTS 5,003,564  3/1991  Fling ........................................ 348/689
5,410,366  4/1995  Hostetler .
5,459,526  10/1995  Yamada ................................... 348/691
5,548,343  8/1996  Paquier et al. ......................... 348/691

FOREIGN PATENT DOCUMENTS 38 17 421A1  2/1990  Germany .
45 15 688A1  11/1993  Germany .
135579  5/1995  Japan .

OTHER PUBLICATIONS

German Examination Report, Aug. 16, 1996.

Primary Examiner—Victor R. Kostak
Attorney, Agent, or Firm—Plevy & Associates

[57] ABSTRACT

A video signal clamping circuit for adapting the DC level of a composite video signal to the processing range of a digital video signal processing device, includes an isolating capacitor in the analog video signal path and a controlled current source which is connected to a floating isolating-capacitor terminal and charges or discharges the isolating capacitor solely by means of a positive or negative clamping current, with the value and sign of the clamping pulses being digitally controlled by a comparator circuit which compares predetermined reference values of the composite video signal with mode-dependent comparison values.

20 Claims, 2 Drawing Sheets

VIDEO SIGNAL CLAMPING CIRCUIT

FIELD OF THE INVENTION

The present invention relates to a video signal clamping circuit for adapting the DC level of a composite video signal to the processing or dynamic range of a video signal processing device, particularly of a digital one.

BACKGROUND OF THE INVENTION

Clamping circuits which adapt the DC level of a composite video signal to the processing or dynamic range of a video signal processing device are known in various forms. Clamping circuits are also used in the processing of analog composite video signals in television receivers, because satisfactory picture reproduction requires a defined video DC level, which is lost during transmission. To restore the DC level, predetermined reference levels or reference values in the composite video signal are used, particularly the so-called black level. At the receiving end, the black level is restored by means of the clamping circuit to a predetermined DC level which is linked with the reproduction characteristic of the picture tube.

Besides the black level, the horizontal-synchronizing pulse can be used to restore the DC level, since its amplitude and level are defined by the respective standard specifying the modulation method to be employed. Deviations from the standard, particularly in case of receiving disturbances, will affect particularly the synchronizing pulse, so that the DC restoration will be disturbed. It is therefore common practice to use only the black level for DC restoration.

The original DC level lost on the transmission path must also be restored during the digital processing of a previously digitized composite video signal at the receiving end. Here, however, a further problem arises, since the processing range of the digital processing devices, particularly the dynamic range of the analog-to-digital converter, is relatively small, so that for the digitization the dynamic range must be utilized to the largest possible extent. This is accomplished firstly by means of an automatic gain control, whereby the signal amplitude is adapted to the dynamic range, and secondly by means of the clamping circuit, which holds the amplified video signal at a predetermined DC level.

DE-A-42 16 668 discloses a video signal clamping circuit in which after the isolating capacitor the video signal is digitized for further processing by means of an analog-to-digital converter. Clamping is effected by means of a positive current source or a negative current source which is activated with a pulse-width-modulated control signal depending on the sign of the result of a clamping-level setpoint/actual-value comparison. The clamping pulse is triggered during the horizontal retrace interval. Through the pulse-width control of the clamping pulses, the charging or discharging of the isolating capacitor, which is caused by the clamping pulse, adapts itself to the respective clamping state.

It is an object of the present invention to provide an improved video signal clamping circuit for restoring the DC level which processes standard and nonstandard composite video signals in such a way as to reach a stable clamping-level state as quickly as possible and to be capable of following rapid, particularly supply-frequency, DC level variations in the composite video signal without impairing the steadiness of the picture under good signal conditions.

SUMMARY OF THE INVENTION

The present invention is directed to a video signal clamping circuit to adapt the DC level of a composite video signal to the processing range of a video signal processing device, the video signal clamping circuit comprising an isolating capacitor in the video signal path, a controlled current source which is connected to the isolating capacitor at the capacitor terminal to be clamped and which supplies the latter with a clamping current adjustable in magnitude and sign, and a clamping level comparator circuit for adjusting the clamping current in accordance with the DC level of the composite video signal. In a first mode, which corresponds to a nonstandard composite video signal and/or to a composite video signal which is not yet in a steady clamping state, the clamping current is dependent on the setpoint/actual-value comparison between a first reference value and a second reference value. In a second mode, which corresponds to a standard composite video signal and/or to a composite video signal which is in a steady clamping state, the clamping current is dependent on the setpoint/actual-value comparison between a second reference value and a second comparison value. A controller is provided which determines the respective mode from the composite video signal.

An isolating capacitor in the analog video signal path is charged or discharged at its floating terminal by means of a pulsed clamping current or a constant current from a controlled current source, with the value and sign of the clamping current being controlled by a clamping level comparator circuit which, depending on the clamping state or on the composite video signal, compares a first or second reference value of the analog or digitized composite video signal with corresponding comparison values.

The invention uses a controlled current source for level tracking. The high internal resistance of the controlled current source and the capacitance of the isolating capacitor form a large time constant, so that the low frequencies of the video signal are not affected. In a similar manner, no modulation of the clamping level by the picture information of the video signal takes place, as would be the case with the use of resistors for clamping. Resistors also necessitate applying high, generally additional, supply voltages in order that the resistor values can be kept relatively high. This is not necessary if the clamping action is obtained with pulses from controlled current sources. Through the variability of the controlled current sources, small or large constant currents or current pulses can be formed which adaptively follow, and can rapidly correct, the different level variations of the composite video signal. If the level variations are very small, the clamping currents can be kept very small or even approach zero, so that each picture line can be very finely readjusted, which is not the case with nonadaptive clamping, as was explained above.

The invention teaches in particular that different reference levels have to be used depending on the operating state or mode. In a first mode, the synchronizing pulse top value, or, with another polarity, the synchronizing pulse bottom value, is used as the reference level for extremely noisy composite video signals, for composite video signals affected by power line fluctuations, for composite video signals not yet clamped to a stable level, or for nonstandard composite video signals. This also permits rapid level stabilization on a channel change, so that rapid switching to the standard clamping mode—this corresponds to the second mode—is possible. In this second mode, the back porch serves as the reference value, with spurious signals being gated out by a gating circuit.

The controlled current source contains either a difference-current source or a positive current source and a negative current source which are selected via the sign of the digital control signal from the clamping level comparator circuit.

3

In the standard state, the signals are standard signals and the clamping level has already been properly set, clamping pulses advantageously occur essentially only during a short time interval within the horizontal retrace interval, because the effect on the video signal is then least disturbing. If a constant clamping current is used, this constant current, which is substantially smaller then the pulsed current, is maintained during one or more entire picture line intervals; the effect on the video signal will then be minimal.

BRIEF DESCRIPTION OF THE DRAWINGS

The invention will now be explained in more detail with reference to the accompanying drawings, in which.

DETAILED DESCRIPTION OF THE INVENTION

Figure 1:
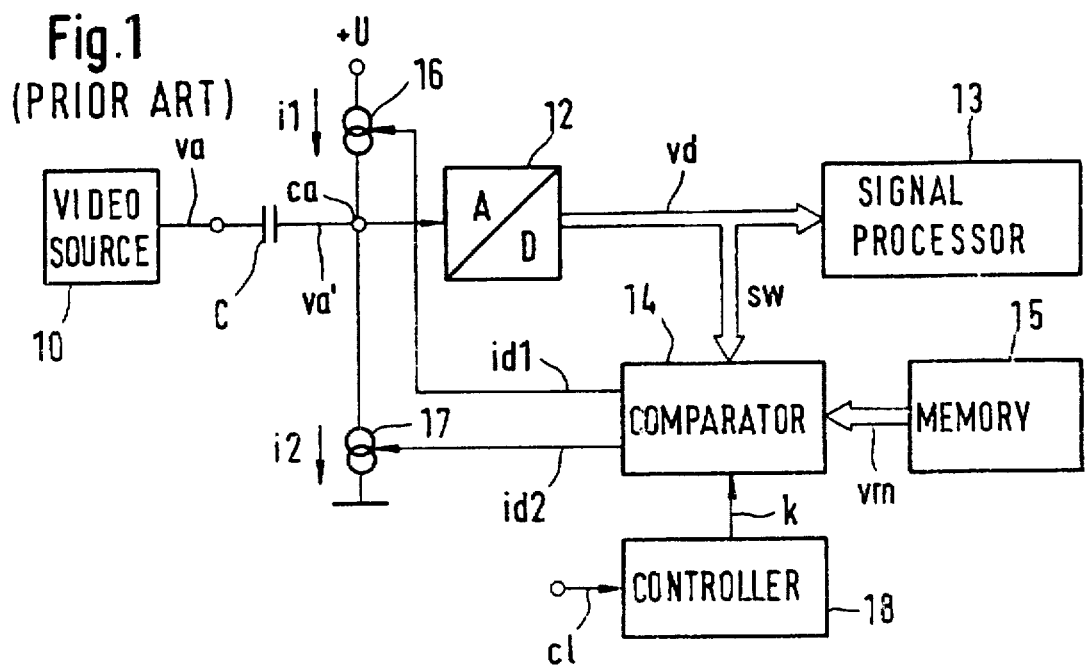
FIG. 1 is a block diagram of a prior-art video signal clamping circuit with digital control.
Figure 2:
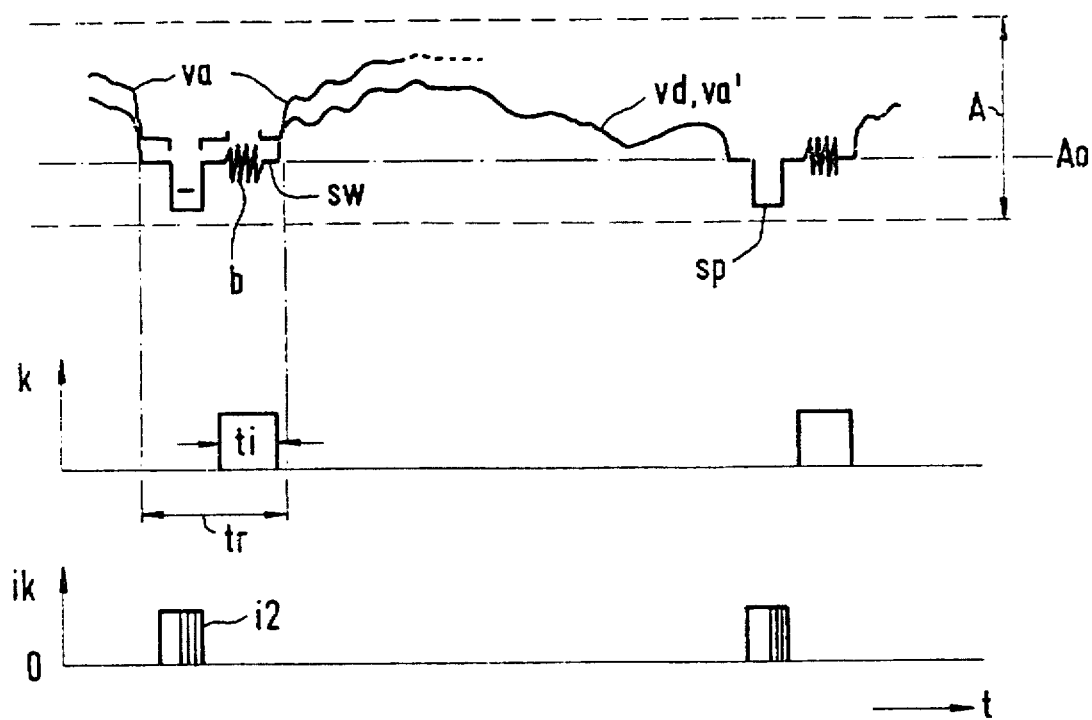
FIG. 2 illustrates the clamping action obtained with the circuit of FIG. 1 by a timing diagram.

Referring to FIG. 1, there is shown a block diagram of the prior-art video signal clamping circuit of reference no. DE-A-42 16 668 which was briefly described above. As can be seen, the clamping circuit is controlled by a digitized composite video signal vd which n the following description, is mostly referred to as the video signal for simplicity, although it will generally contain the usual components of the composite color signal. An arbitrary video signal source 10 provides an analog video signal va, whose DC level is irrelevant, because the video signal path includes an isolating capacitor C which blocks the DC level in the analog video signal va. The video signal source 10 may, of course, include means for automatic gain control, so that the analog video signal can be assumed to lie within a predetermined amplitude range. The floating isolating-capacitor terminal ca with the video signal va' is connected to an analog-to-digital converter 12, which may also be regarded as an input stage of a digital video signal processing circuit 13, and to a first current source 16 and a second current source 17. The output of the digital-to-analog converter 12 provides the digitized video signal vd to the digital video signal processing circuit 13 and to a clamping level comparator circuit 14. The digital video signal processing circuit 13 represents schematically the further signal processing in the television receiver, which, however, is not of interest here. The comparator circuit 14 compares a clamping level comparison value vm from a memory device 15 with the corresponding portion or reference value sw of the digitized video signal vd. The comparison provides a difference signal which, if the reference value differs from the comparison value (see. FIG. 2), triggers a first or second control signal id1, id2 for the first or second current source 16, 17. These control signals initiate a first or second pulsed clamping current i1, i2 which charges or discharges the isolating capacitor C via the capacitor terminal ca. The value of the first or second control signal id1, id2 causes a corresponding duration of the first or second clamping pulse, whereby pulse-width-modulated pulses i1, i2 are produced. The charging or discharging thus adapts itself to the clamping-level deviation, whereby an acceleration of the clamping process is achieved.

To ensure that the voltage comparison in the comparator circuit 14 is performed at the correct time during the back porch sw of the video signal va, va', vd, a controller 18 provides a gating pulse k of duration ti to the comparator circuit 14.

4

FIG. 2 shows the signals in a timing diagram. The first line shows the digitized video signal vd, whose digitally defined (and, thus, nonreal) DC level corresponds to the real DC level of the clamped analog video signal va', and whose waveform is identical to that of the analog video input signal va except for a DC level difference, the analog video signal va being only indicated in FIG. 2. The dynamic range of the digital video signal processing device 13, and particularly that of the analog-to-digital converter 12, corresponds, for example, to the range A shown. The clamping circuit must fix the back porch reference value sw of the video signal vd at a reference value Ao of the digital dynamic range A. As a rule, this digital reference value will not be at the center of the dynamic range A of the analog-to-digital converter 12. The horizontal-sync pulse with its top DC value sp interferes with the black level clamping and is gated out, for example, by the gating pulse k, cf the last line. As a result, the back porch sw is the most negative signal value during the horizontal retrace interval tr and the gating pulse k; the color burst b must be filtered out or gated out. Because of the polarity of the video signal vd in FIG. 2, the sync pulse top DC value sp may also be referred to as the sync pulse bottom DC value.

Of the pulsed clamping currents i1, i2 for charging or discharging the isolating capacitor C, the pulse-width-modulated discharging pulse i2 is shown as the clamping current ik in the last line of FIG. 2. The discharging pulse i2 is triggered approximately at the time of occurrence of the sync pulse, so that the back porch sw for the level determination will not be disturbed during the gating interval.

Figure 3:
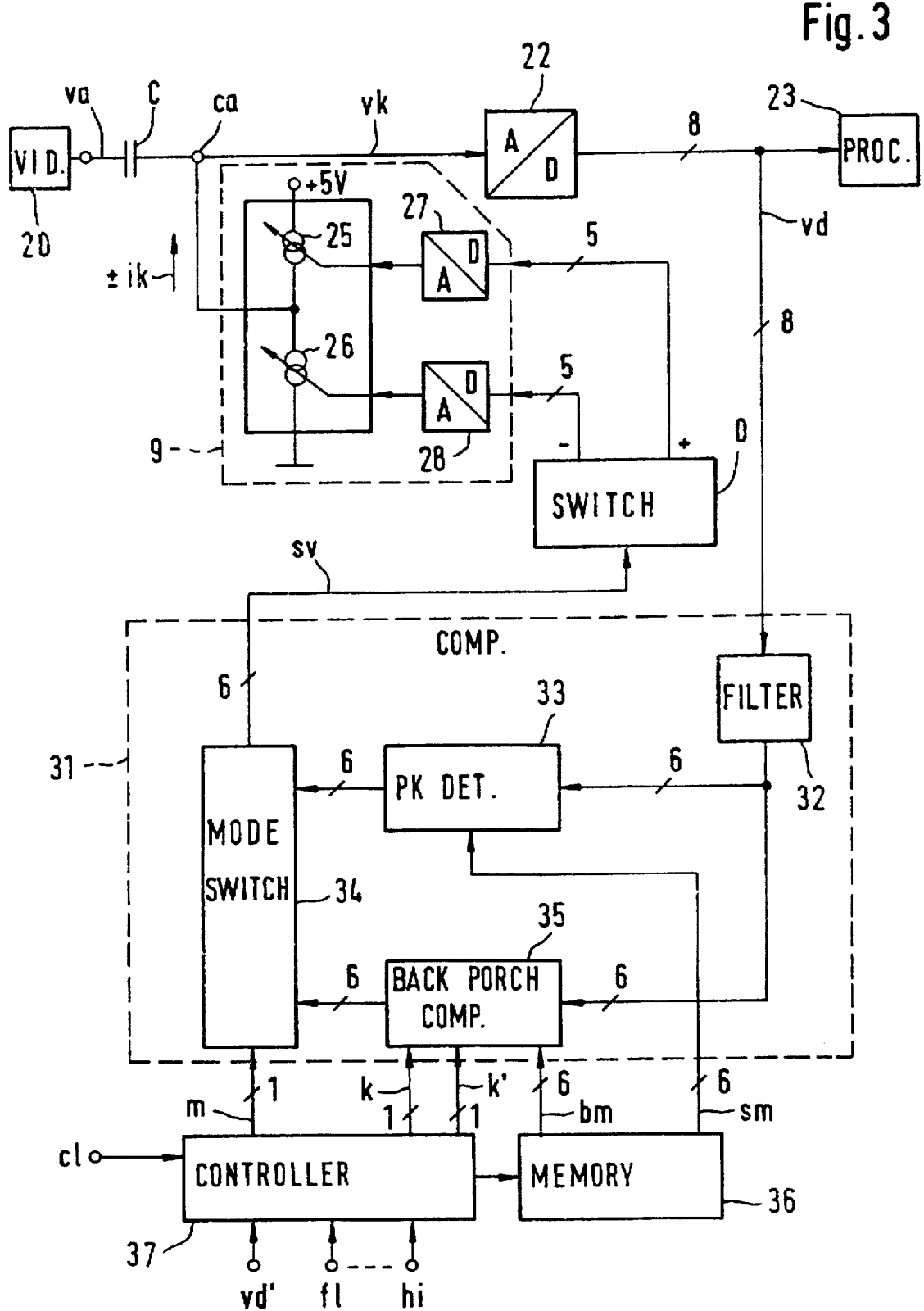
FIG. 3 is a block diagram of an embodiment of a clamping circuit according to the present invention.

FIG. 3 shows the block diagram of an embodiment of a video signal clamping circuit according to the invention. Like in clamping circuit of FIG. 1, depending on the DC level, a controlled current source 24 generates a charging or discharging current as a clamping current ik, the value of the latter being digitally adjustable. In the embodiment of FIG. 3, the clamping current ik is not to be a pulsed current, but is to remain constant during at least one whole picture line. A first controlled current source 25 and a second controlled current source 26 are controlled by a first digital-to-analog converter 27 and a second digital-to-analog converter 28, respectively, to form the charging or discharging current. The two current sources 25 and 26, like the remainder of the circuit, may be implemented in CMOS monolithic integrated circuit technology. Since the clamping currents ik are constant and not pulsed, they do not require any particularly high or low supply voltages or even pulse-width control as in the prior-art circuit of FIG. 1.

A video signal source 20, which provides the analog composite video signal va, is followed by the isolating capacitor C, whose terminal ca is connected to both the output of the controlled current source 24 and the input of the analog-to-digital converter 22, whose output provides the digitized composite video signal vd to a digital video signal processing circuit 23.

To control the current source 24, the digitized video signal vd provided at the output of the analog-to-digital converter 22, like in FIG. 1, is also fed to a comparator circuit 31 which compares the respective reference level with a comparison value and derives from the respective difference a signed 6-bit control signal sv which controls the first and second digital-to-analog converters 27 and 28. The selection is made by means of the sign bit in the control signal sv and by an electronic switch 30. A controller 37 generates the necessary control pulses, particularly a gating pulse k for the measurement interval during the back porch level measurement. If necessary, the controller 37 will provide further gating pulses k'. That may be the case, for example, if the digitized video signal vd is too much delayed by a digital interference filter 32, e.g., a filter for eliminating the color burst b. Each current source 25, 26 of the controlled current source 24 may contain a plurality of MOS transistors connectable in parallel as separate current sources or as a sort of current bank which are controllable, individually or in combination, directly by the digital control signals sv. The digital-to-analog converters 27, 28 can then be dispensed with. The current source 24 may also be designed as a difference-current source or in another form; what is important is that in a pulsed mode, the sign and magnitude of the clamping current ik and/or the duration of the latter are adjustable, particularly digitally.

The controller 37 receives various signals, namely a system clock cl, a flyback signal fl locked to the deflection system, and a modified video signal vd', which may contain the individual sync components in separate form, for example. Further applied signals are indicated schematically as auxiliary signals hi. The levels sm, bm for the clamping-level comparison either can be taken from a memory device 36 like in FIG. 1 or are applied via a digital bus system.

A substantial improvement of the clamping action is achieved if a distinction is made between a steady state with a standard composite video signal va, va', vd and an unsteady state or a state with a nonstandard composite video signal. For each of these state, the clamping action can then be optimized separately. For the nonstandard state, herein also referred to as the first mode, clamping to the synchronizing pulse top value sp is to be recommended. Strictly speaking, with the polarity of the composite video signal according to FIG. 2, this is the synchronizing pulse bottom value, because with the usual modulation, this value equals the lowest signal value. The sync pulse top value sp or bottom value is found by a peak detector 33 which compares the measured peak value with an applied sync pulse top comparison value sm. Its 6-bit output signal is fed to a mode switch 34 which is controlled by a mode control signal m from the controller 37. The clamping to the sync pulse top sp requires no gating circuit whatsoever, because in the conventional modulation and conversion methods the pulse top, as a rule (cf FIG. 2), has the lowest/highest voltage value. Spurious signals are filtered out by the digital filter 32. The peak detector 33 could also be implemented with a separate, specifically adapted filter, of course. Without a gating circuit, the clamping circuit in this mode also responds very quickly to changes in level.

The normal clamping mode with standard signals represents a second mode, in which the clamping is referred to the back porch reference value sw. This is accomplished by means of a back porch comparator circuit 35, whose 6-bit output signal is fed to the mode switch 34. The comparator circuit 35 compares the back porch reference value sw with a stored back porch comparison value bm, the comparison and the pulse trigger action being controlled by the gating pulse k and, if necessary, by further gating pulses k'. Through the gating, spurious signals can be largely eliminated, so that the clamping will provide a very steady picture even if the received video signal is very noisy but otherwise corresponds to a standard signal.

The determination as to which mode is present is made in the controller 37 and is based on known criteria. To determine a standard state and standard composite video signals, the fixed frequency ratio between the color burst and the horizontal scanning frequency may be used, for example. Because of the high frequencies, this criterion is relatively insensitive to noise and other spurious signals. Further distinguishing methods use, for example, suitable gating circuits for evaluating characteristic properties of the composite video signal.

The embodiment is shown in FIG. 3 as a block diagram and was described accordingly. Individual functional units which relates to the processing of data may also be implemented with programmable processors, of course. Moreover, it should be understood that the embodiment described herein is merely exemplary and that a person skilled in the art may make many variations and modifications to the embodiments utilizing functionally equivalent elements to those described herein. Any and all such variations or modifications as well as others which may become apparent to those skilled in the art, are intended to be included within the scope of the invention as defined by the appended claims.

What is claimed is:

1. A video signal clamping circuit for adapting the DC level of a composite video signal to the processing range of a digital video signal processing device, said video signal clamping circuit comprising:

an isolating capacitor in the video signal path;

a controlled current source which is connected to a capacitor terminal to be clamped and supplies the capacitor terminal with a clamping current which is adjustable in magnitude and sign; and a clamping level comparator circuit for adjusting the clamping current in accordance with the DC level of the composite video signal;

wherein, in a first mode, which corresponds to one of a nonstandard composite video signal and a composite video signal that is not yet in a steady clamping state, the clamping current is dependent on a setpoint/actual-value comparison between a first reference value and a first comparison value, and in a second mode, which corresponds to one of a standard composite video signal and a composite video signal that is in a steady clamping state, the clamping current is dependent on a setpoint/actual-value comparison between a second reference value and a second comparison value; and a controller for determining the respective mode from the composite video signal.

2. A clamping circuit according to claim 1, wherein the clamping level comparator circuit evaluates one of a sync pulse top and sync pulse bottom value in the composite video signal as the first reference value and a back porch reference value in the composite video signal as the second reference value.

3. A clamping circuit according to claim 1, wherein the clamping current remains essentially constant during at least one entire picture line.

4. A clamping circuit according to claim 1, wherein the one of the sync pulse top and sync pulse bottom value is determined by means of a peak detector.

5. A clamping circuit according to claim 4, wherein the peak detector is fed with a composite video signal freed from noise components and/or useful-signal components by means of a filter.

6. A clamping circuit according to claim 2, wherein the back porch reference value is determined from the composite video signal freed from noise components and/or useful-signal components by a filter during the back porch of the composite video signal.

7. A clamping circuit according to claim 2, wherein the back porch reference value is determined from the composite video signal freed from noise components and/or useful-signal components by a gate controlled by a gating signal, with the gate being opened by the controller during the back porch of the composite video signal.

8. A clamping circuit according to claim 5, wherein the filter frees the composite video signal from color burst.

9. A video signal clamping circuit for adapting the DC level of a composite video signal to the processing range of a digital video signal processing device, said video signal clamping circuit comprising:

an isolating capacitor in the video signal path and coupled to a capacitor terminal;

a controlled current source which is connected to the capacitor terminal and supplies the capacitor terminal with a clamping current which is adjustable in magnitude and sign; and a clamping level comparator circuit for adjusting the clamping current in accordance with the DC level of the composite video signal, such that in a first mode corresponding to one of a nonstandard composite video signal and a composite video signal not yet in a steady clamping state, the clamping current is dependent on a comparison between a first predetermined reference value and a first mode dependent comparison value, and in a second mode corresponding to one of a standard composite video signal and a composite video signal in a steady clamping state, the clamping current is dependent on a comparison between a second predetermined reference value and a second mode dependent comparison value; and a controller for determining which one of the first and second modes is present.

10. A clamping circuit according to claim 9, wherein the clamping level comparator circuit evaluates one of a sync pulse top and sync pulse bottom value in the composite video signal as the first reference value and a back porch reference value in the composite video signal as the second reference value.

11. A clamping circuit according to claim 10, wherein the clamping current remains essentially constant during at least one entire picture line.

12. A clamping circuit according to claim 10, wherein the one of the sync pulse top and sync pulse bottom value is determined by means of a peak detector.

13. A clamping circuit according to claim 12, wherein the peak detector is fed with a composite video signal freed from noise components and/or useful-signal components by means of a filter.

14. A clamping circuit according to claim 11, wherein the one of the sync pulse top and sync pulse bottom value is determined by means of a peak detector.

15. A clamping circuit according to claim 14, wherein the peak detector is fed with a composite video signal freed from noise components and/or useful-signal components by means of a filter.

16. A clamping circuit according to claim 15, wherein the filter frees the composite video signal from color burst.

17. A clamping circuit according to claim 10, wherein the back porch reference value is determined from the composite video signal freed from noise components and/or useful-signal components by a filter during the back porch of the composite video signal.

18. A clamping circuit according to claim 17, wherein the filter frees the composite video signal from color burst.

19. A clamping circuit according to claim 10, wherein the back porch reference value is determined from the composite video signal freed from noise components and/or useful-signal components by a gate controlled by a gating signal, with the gate being opened by the controller during the back porch of the composite video signal.

20. A video signal clamping circuit for adapting the DC level of a composite video signal to the processing range of a digital video signal processing device, said video signal clamping circuit comprising:

an isolating capacitor in the video signal path and coupled to a capacitor terminal;

current supply means coupled to the capacitor terminal, for supplying the capacitor terminal with an adjustable clamping current; and circuit means for adjusting the clamping current in accordance with the DC level of the composite video signal, such that in a first mode corresponding to one of a nonstandard composite video signal and a composite video signal not yet in a steady clamping state, the clamping current is dependent on a comparison between a first predetermined reference value and a first mode dependent comparison value, and in a second mode corresponding to one of a standard composite video signal and a composite video signal in a steady clamping state, the clamping current is dependent on a comparison between a second predetermined reference value and a second mode dependent comparison value; and controller means for determining which one of the first and second modes is present.

* * * * *